US006418970B1

(12) United States Patent
Deul

(10) Patent No.: US 6,418,970 B1
(45) Date of Patent: Jul. 16, 2002

(54) ACCUMULATOR APPARATUS, SYSTEM AND METHOD

(75) Inventor: Hans Herman Jacques Deul, Richmond, TX (US)

(73) Assignee: Noble Drilling Corporation, Houston, TX (US)

( * ) Notice: Subject to any disclaimer, the term of this patent is extended or adjusted under 35 U.S.C. 154(b) by 0 days.

(21) Appl. No.: 09/697,996

(22) Filed: Oct. 24, 2000

(51) Int. Cl.[7] .................................... F16L 55/04

(52) U.S. Cl. .................... 138/31; 138/26; 60/416

(58) Field of Search .................... 138/31, 30, 26; 60/414–416; 166/364, 368

(56) References Cited

U.S. PATENT DOCUMENTS

| | | | | | |
|---|---|---|---|---|---|
| 3,653,635 A | * | 4/1972 | Bates, Jr. et al. | 254/172 |
| 3,912,227 A | * | 10/1975 | Meeker et al. | 60/413 X |
| 3,918,498 A | * | 11/1975 | Schneider | 138/31 |
| 3,987,708 A | * | 10/1976 | Uhrich | 138/31 X |
| 4,205,594 A | * | 6/1980 | Burke | 92/65 |
| 4,649,704 A | * | 3/1987 | Marsh | 60/415 |
| 6,202,753 B1 | | 3/2001 | Baugh | 166/364 |
| 6,266,959 B1 | * | 7/2001 | Markwart | 60/414 |

* cited by examiner

*Primary Examiner*—Patrick Brinson
(74) *Attorney, Agent, or Firm*—Thompson & Knight, L.L.P.

(57) ABSTRACT

A pressure accumulator apparatus is disclosed for use in offshore drilling and production which comprises a pressure vessel (30) having a first compartment (34) and a second compartment (38), a partition (32) between the first compartment and the second compartment, a means for admitting fluid at ambient pressure into a portion (44) of the first compartment, a means for controlling an amount of hydraulic fluid ejected from a portion (46) of the second compartment, a first piston member (48) circumscribed by an interior wall of the first compartment, said first piston member being capable of sliding within the first compartment, a second piston member (50) circumscribed by an interior wall of the second compartment, said second piston member being capable of sliding within the second compartment, and a means (52) for connecting the first piston member and the second piston member.

27 Claims, 3 Drawing Sheets

ACCUMULATOR APPARATUS, SYSTEM AND METHOD

FIELD OF THE INVENTION

The present invention relates generally to the field of exploration and production of oil and other fossil fuels from a well, and more particularly, to a pressure accumulator apparatus, system and method for use in offshore drilling and production.

BACKGROUND OF THE INVENTION

In order to extract natural resources from reservoirs beneath the floor of large bodies of water, drilling operations have been conducted offshore. In a typical offshore drilling system, a platform floating in the ocean or installed on the seabed is used to support an offshore drilling rig. A riser string is typically provided between the platform and the wellhead at the ocean floor.

Due to the continual demand for precious natural resources, the oil industry has continued to push the water depth frontiers of exploratory drilling and production of oil and gas in subsea environments. As a result of the venture into deeper waters, many challenges have arisen. Indeed, safety and other considerations in offshore drilling operations require that the drilling equipment be able to rapidly close the well bore in order to prevent accidental blowouts, regardless of the water depth.

Many drilling platforms include high pressure valve systems known as blowout preventers (BOPs) as a standard part of the drilling equipment. BOPs are utilized to quickly shut off the uncontrolled flow of pressurized fluids. A BOP typically involves delivery of pressurized hydraulic fluid into and out of opening and closing chambers to control force urging seal elements into sealing relation with drill pipe, tubing or a wireline extending through a casing, or to move seal elements into sealing relation with each other to close off an open hole. Several different types of BOPs may be stacked together to provide control under various circumstances.

Conventional hydraulic BOP control systems experience delays in operating subsea BOP functions in deep water applications because the time required to send a hydraulic activation signal through an umbilical hose from the surface control station to the subsea pilot control valve becomes excessively long in deep water. Furthermore, delivery of sufficient quantities of pressurized operating fluid to the BOP from the surface requires a substantial amount of time.

Therefore, in lieu of transferring hydraulic fluid or hydraulic control pressure from the surface of the drilling rig through a hydraulic conduit on the riser, the hydraulic fluid can be transferred to accumulators. Accumulators are generally known as vessels which contain hydraulic fluid under pressure for use in effecting BOP closure. Through the use of compressed gas such as nitrogen, accumulators store energy which can be used to effect rapid BOP closure. Various types of accumulators have been used in the prior art, such as bladder types and guided float types, some of which actuate a spring-loaded liquid inlet-outlet valve.

As the water depth varies, the pressure of nitrogen gas that is in the accumulator varies to balance the effect of the hydrostatic pressure needed to maintain the efficiency of hydraulics. As the control system is lowered through the ocean water, the hydrostatic pressure increases, and the hydraulic stability within the accumulator is lost because it does not have an accurate pressure reference that is of the correct pressure. Uncertainty therefore arises as to whether the device is functioning properly as it travels down to the well head. Furthermore, the number of accumulators needed to provide useable fluid to operate the BOP may be difficult to ascertain. In addition, the number of accumulators that may be used is limited by the size of the BOP frame.

Furthermore, conventional bladder-type systems in the prior art are constrained in that as the system is lowered into the ocean water, multiple stops may be required depending on the water depth in order to recharge the system, due to a loss of useable hydraulic fluid as the water depth increases. To stop the operations of lowering the BOP stack through the water requires connecting a hydraulic line, flushing the line so that salt water does not enter the control system, and then recharging the accumulators. Typically, this process can take a significant amount of time. As the costs of operating an offshore rig often approach several thousand dollars per hour, frequent and lengthy delays in operations therefore contribute to substantial increases in the costs of the drilling operations.

Further difficulties arise with regard to performing preventive maintenance on the equipment. The equipment is very comprehensive in terms of component count, system architecture, and complexity. The accumulators must be removed to reach the hydraulic equipment, and then later reconnected. This is very burdensome and time-consuming, and creates concern for single-point failure within the hydraulic system.

A need has therefore arisen for an apparatus, system, and method that overcomes the limitations of the prior art. A reduction in the required number of accumulators would improve the accessibility to other critical components and reduce the amount of time required for equipment maintenance. The elimination of the need for having high-pressure booster pumps and banks of nitrogen bottles located on the rig, which expose personnel to safety hazards, would be an improvement upon the prior art. The foregoing improvements would greatly facilitate offshore oil production at greater depths of water while reducing operation and equipment costs as well as safety hazards.

SUMMARY OF THE INVENTION

Accordingly, the present invention provides an improved pressure accumulator device for use in deep offshore drilling operations. In accordance with a preferred embodiment of the present invention, a pressure accumulator apparatus for use in offshore drilling and production comprises a pressure vessel having a first compartment and a second compartment, a partition between the first compartment and the second compartment, a means for admitting fluid at ambient pressure into a portion of the first compartment, a means for controlling an amount of hydraulic fluid ejected from a portion of the second compartment, a first piston circumscribed by an interior wall of the first compartment, said first piston being capable of sliding within the first compartment, a second piston circumscribed by an interior wall of the second compartment, said second piston being capable of sliding within the second compartment, and a means for connecting the first piston and the second piston. During deployment, fluid, i.e., water, at ambient pressure enters the pressure accumulator device. As the BOP system is deployed and the hydrostatic pressure from the water increases, the piston will cause a balancing effect on the hydraulic fluid stored in the pressure accumulator device. Thus, the piston rod will either be in tension or compression.

Also disclosed is a system for delivering pressurized hydraulic fluid to a BOP for use in offshore drilling and production comprising a plurality of pressure accumulator devices in accordance with a preferred embodiment of the present invention, a means for serially connecting hydraulic fluid volumes of the accumulator devices, and a structure on which to mount the plurality of dual piston pressure accumulators.

A preferred method of pressurizing hydraulic fluid in a dual piston pressure accumulator for use in offshore drilling and production is also disclosed, comprising the steps of drawing a vacuum in the volume of a first portion of a first compartment of a pressure vessel, said first portion being adjacent to a first side of a first piston circumscribed by the first compartment of the pressure vessel. Said method further comprises the step of injecting a gas to pressurize, to a specified pressure, the volume of a first portion of a second compartment of the pressure vessel, said first portion being adjacent to a first side of a second piston circumscribed by the second compartment of the pressure vessel, wherein the second piston is connected to the first piston. Said method further comprises the steps of filling with hydraulic fluid the volume of a second portion of the second compartment of the pressure vessel, said second portion being adjacent to a second side of the second piston, and admitting ambient fluid into a second portion of the first compartment of the pressure vessel, said second portion being adjacent to a second side of the first piston member.

The gas typically used is nitrogen gas ($N_2$). An object of the present invention is to provide a pressure accumulator that eliminates the need for high precharges of nitrogen which expose personnel to safety hazards during the operation of putting the nitrogen into the systems. Further eliminated is the need of having high-pressure booster pumps and banks of nitrogen bottles onboard the drilling rig. In addition, the required number of accumulators is reduced, since the useable fluid of the accumulator device of the present invention is greater than the conventional gas bag or bladder separator-type accumulator. Furthermore, by having fewer accumulator bottles on the BOP stack, the accessibility to other critical components is improved.

The present invention therefore allows for deployment of the BOP hydraulic equipment from the surface all the way down to the bottom of the ocean without having to stop and recharge, possibly risk contamination of the system with salt water or other debris, and improve on rig critical path efficiency. The features of the present invention are thus particularly advantageous with respect to deepwater drilling and production operations.

For a more complete understanding of the present invention, including its features and advantages, reference is now made to the following detailed description, taken in conjunction with the accompanying drawings.

BRIEF DESCRIPTION OF THE DRAWINGS

Other objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

Corresponding numerals and symbols in the different figures refer to corresponding parts unless otherwise indicated.

DETAILED DESCRIPTION OF A PREFERRED EMBODIMENT OF THE INVENTION

Figure 1:
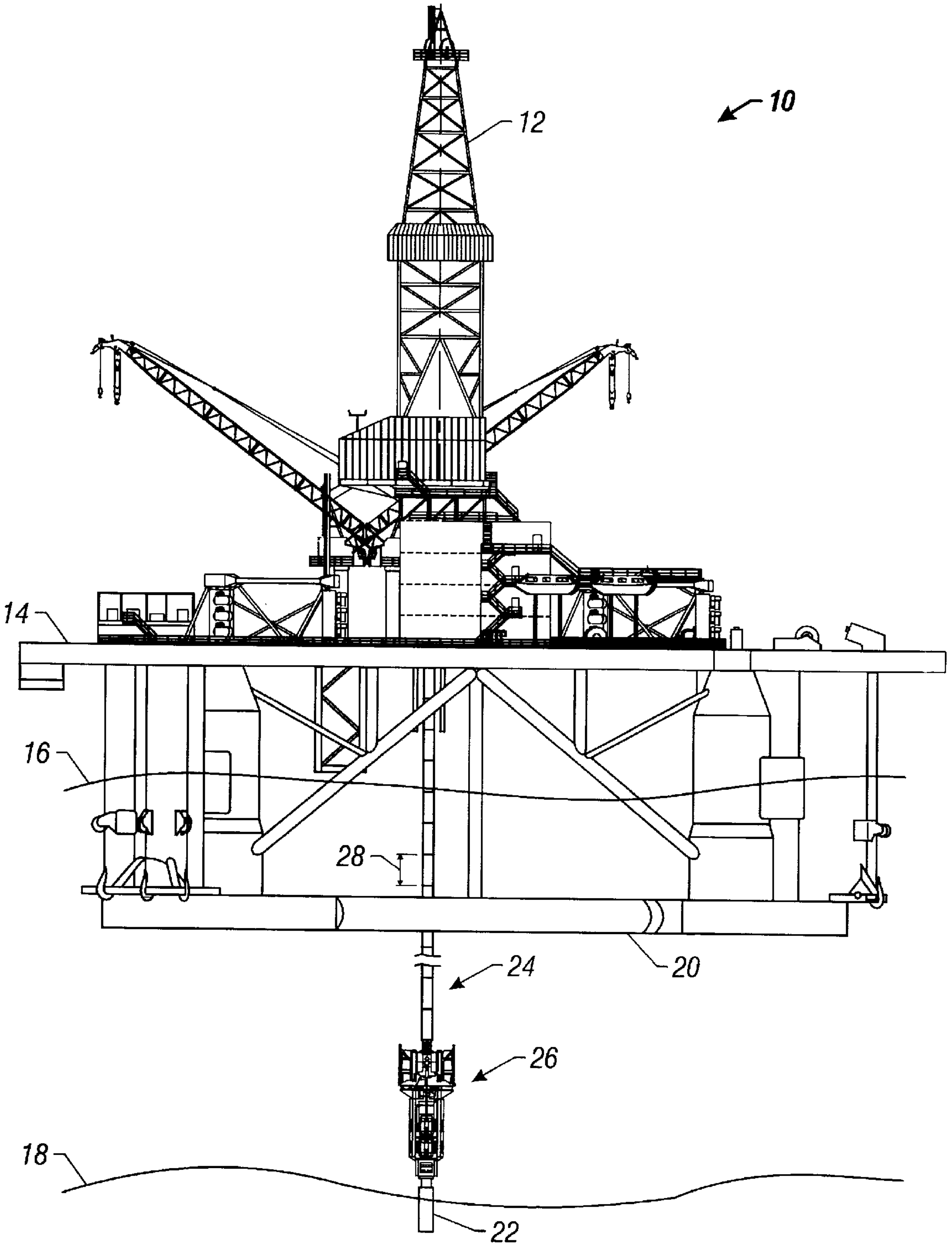
FIG. 1 is an elevational view of an offshore drilling rig system in accordance with one embodiment of the present invention.

Reference is now made to FIG. 1, in which an offshore drilling rig is designated generally by the numeral 10 for illustrating the context of the present invention. While offshore drilling rig 10 is depicted as a semi-submersible drilling rig, it will be appreciated by those skilled in the art that the apparatus, system and method of the present invention find equal application to other types of drilling rigs, such as drill ships and the like.

Figure 2:
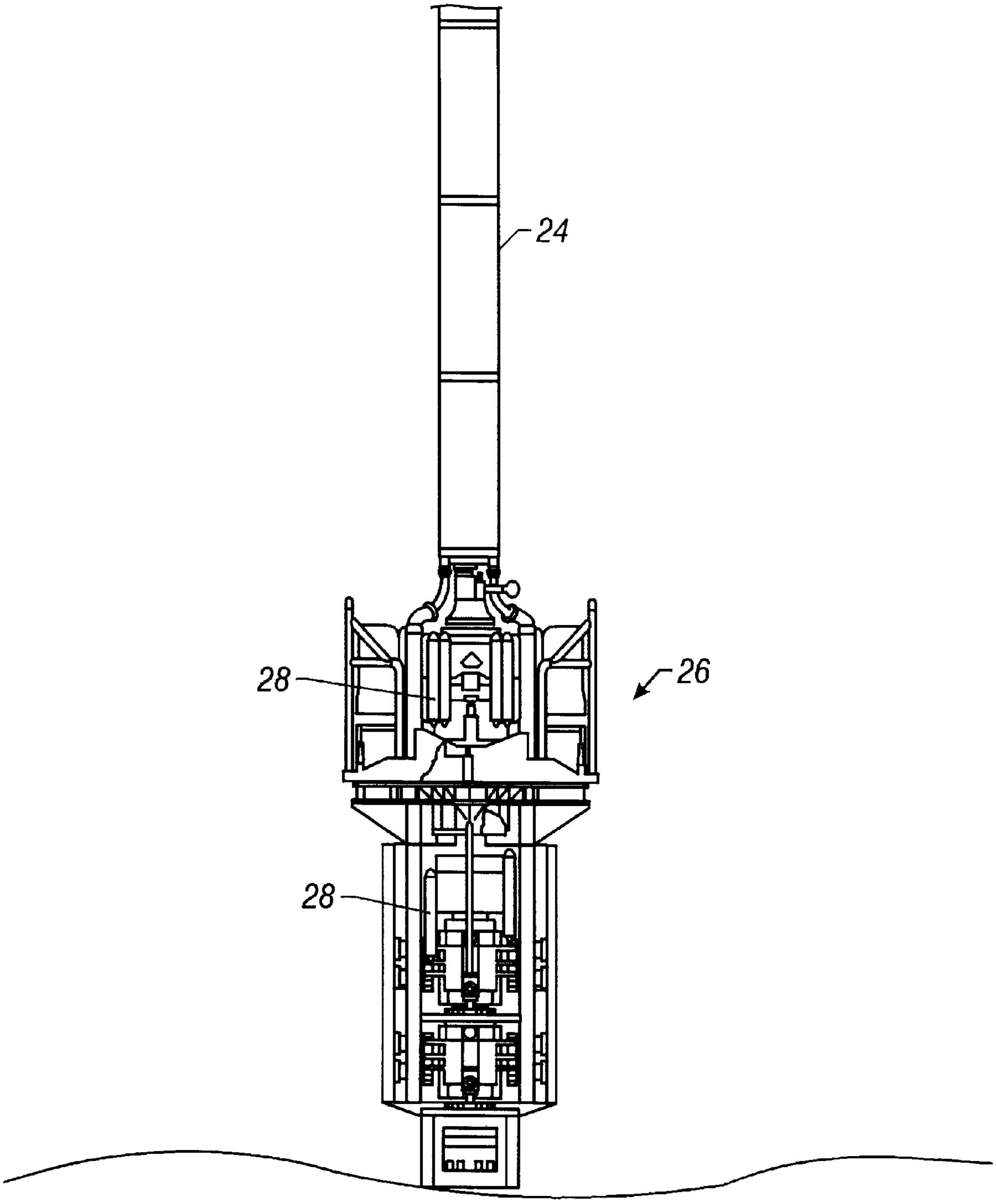
FIG. 2 is an elevational view of a blowout preventer in accordance with one embodiment of the present invention.

Offshore drilling rig 10 comprises an oil derrick 12 carried by a platform 14. Platform 14 floats in a body of water 16 over a seabed 18 with the support of one or more pontoons 20. Derrick 12 functions primarily to drill a well bore 22 if deployed and to pump oil and other fossil fuels from a well. A riser 24 extends from platform 14 to the drilling equipment and a blowout preventer (BOP) assembly 26. An enlarged view of the BOP assembly 26 is shown in FIG. 2, in which a plurality of accumulator bottles 28 (or "accumulators") are also depicted.

Figure 3:
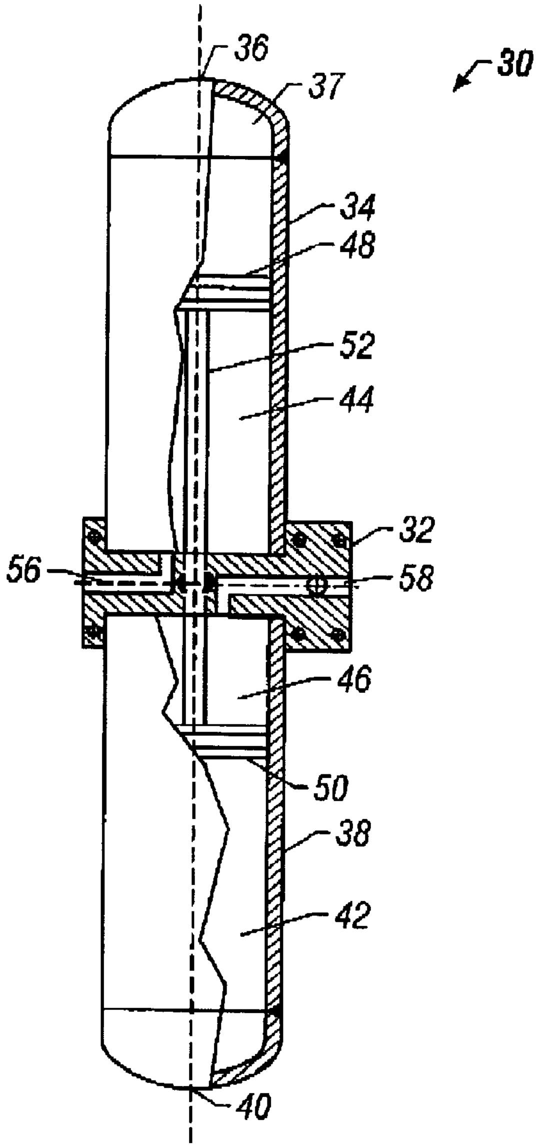
FIG. 3 is a partial sectional view of an accumulator in accordance with a preferred embodiment of the present invention.

A partial sectional view of an accumulator 30 in accordance with a preferred embodiment of the present invention is illustrated in FIG. 3. Accumulator 30 comprises a cylinder block 32 to which a first cylindrical container 34 is securely fastened. Cylindrical container 34 includes a port 36 for initially drawing a vacuum in a chamber 37 of cylindrical container 34.

A second cylindrical container 38 is securely fastened to the opposite end of cylinder block 32. Cylindrical container 38 includes a port 40 for injecting a fixed precharge of gas, such as nitrogen gas ($N_2$) into a chamber 42 of cylindrical container 38.

A chamber 44 is bounded within cylindrical container 34 by cylinder block 32 and a piston member 48. Likewise, a chamber 46 is bounded within cylindrical container 38 by cylinder block 32 and a piston member 50. Piston member 48 and piston member 50 are coupled to opposite ends of a piston rod 52 to comprise a dual-ended piston. Piston rod 52 slides through a bore of cylinder block 32.

Piston rod 52 and the bore of cylinder block 32 are preferably double chrome plated. One or more lip seals may be seated in grooves in cylinder block 32 to provide a tight seal. Likewise, one or more lip seals may be seated in grooves in piston member 48, and one or more lip seals may be seated in grooves in piston member 50.

Cylindrical container 34 and cylindrical container 38 are preferably both composed of a material exhibiting durability and resistance to corrosion. Cylindrical container 34 and cylindrical container 38 may each comprise a separate segment of pipe welded to a pipe cap. A ceramic liner may also be included on the inner wall of cylindrical container 34 and on the inner wall of cylindrical container 38 for maintaining a low coefficient of friction as the dual-ended piston slides up and down. It also has a self-cleaning attribute so that as contaminants possibly enter into the system, such as, for example, calcium stearate deposits from salt water, it will have a self-wiping effect so that reliability is maintained.

As depicted in FIG. 3, cylinder block 32 includes an inlet 56 to cylindrical container 34 for admitting ambient fluid, i.e., sea water, into chamber 44 within cylindrical container 34. Cylinder block 32 further includes an outlet 58 from cylindrical container 38 for ejecting hydraulic fluid stored in chamber 46 within cylindrical container 38. A valve may be provided at outlet 58 for controlling or regulating the amount of hydraulic fluid that is ejected from chamber 46.

During deployment, fluid, i.e., water, at ambient pressure enters the accumulator 30 via inlet 56. As the BOP system is deployed and the hydrostatic pressure from the water increases, the dual-ended piston will cause a balancing effect on the hydraulic fluid stored in chamber 46. Outlet 58 is interconnected to adjacent accumulator bottles, to the supply line from the rig and the valving system that operates the BOP functions.

The advantages of the present invention are many. First is the elimination of the need for high precharges of nitrogen which expose personnel to safety hazards during the operation of putting the nitrogen into the systems. Further eliminated is the need of having high-pressure booster pumps and banks of nitrogen bottles onboard the rig.

In addition, the required number of accumulator bottles is reduced, since the useable fluid of the accumulator of the present invention is greater than the conventional gas bag or bladder separator-type accumulator. By having fewer accumulator bottles on the BOP stack, the accessibility to other critical components is improved.

The present invention therefore allows deployment of the hydraulic equipment used in deep offshore drilling operations, from the surface all the way down to the bottom of the ocean without having to stop and recharge, possibly risk contamination of the system with salt water or other debris, and improve on rig-critical path efficiency.

Figure 4:
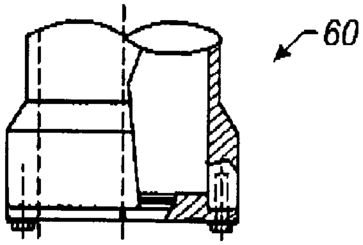
FIG. 4 is a partial sectional view of a terminal end of an accumulator in accordance with an alternative embodiment of the present invention.

Referring again to FIG. 3, while cylindrical containers 34 and 38 have been described as generally cylindrical for housing generally circular piston members 48 and 50, it should be appreciated by those skilled in the art that these and other elements may take alternative shapes and configurations consistent with the principles of the present invention. Likewise, while the terminal ends of cylindrical containers 34 and 38 have been depicted as rounded, it will be appreciated by those skilled in the art that they may take alternative shapes and configurations consistent with the principles of the present invention. For example, a partial sectional view of a terminal end 60 of an accumulator in accordance with an alternative embodiment of the present invention is depicted in FIG. 4.

While this invention has been described with reference to illustrative embodiments, this description is not intended to be construed in a limiting sense. Various modifications and combinations of the illustrative embodiments as well as other embodiments of the invention will be apparent to persons skilled in the art upon reference to the description. It is therefore intended that the appended claims encompass any such modifications or embodiments.

What is claimed is:

1. A pressure accumulator apparatus comprising:

a pressure vessel having a first compartment and a second compartment;

a means for partitioning the pressure vessel into the first compartment and the second compartment;

a means for admitting fluid at ambient pressure into a first portion of the first compartment of the pressure vessel;

a means for controlling an amount of hydraulic fluid ejected from a first portion of the second compartment of the pressure vessel;

a means for admitting pressurized gas into a second portion of the second compartment of the pressure vessel;

a first piston member circumscribed by an interior wall of the first compartment of the pressure vessel, said first piston member being capable of sliding within the first compartment of the pressure vessel;

a second piston member circumscribed by an interior wall of the second compartment of the pressure vessel, said second piston member being capable of sliding within the second compartment of the pressure vessel; and a means for connecting the first piston member and the second piston member in tension; wherein the pressure vessel is configured so that a second portion of the first compartment of the pressure vessel can contain a lower than ambient pressure.

2. The apparatus of claim 1, wherein the first compartment of the pressure vessel comprises a first segment of generally cylindrical pipe, and wherein the second compartment of the pressure vessel comprises a second segment of generally cylindrical pipe.

3. The apparatus of claim 1, wherein the first compartment of the pressure vessel is positioned above the second compartment of the pressure vessel.

4. The apparatus of claim 1, wherein the means for connecting the first piston and the second piston comprises a generally cylindrical piston rod, wherein one end of the piston rod is screw-mounted to a generally centrally located threaded bore on the first piston, and wherein an opposite end of the piston rod is screw-mounted to a generally centrally located threaded bore on the second piston.

5. The apparatus of claim 1, wherein a first lip seal is seated in a circumferential groove in the first piston, and wherein a second lip seal is seated in a circumferential groove in the second piston.

6. The apparatus of claim 1, wherein the interior wall of the first compartment of the pressure vessel is composed of a material providing low friction and high corrosion resistance, and wherein the interior wall of the second compartment of the pressure vessel is composed of a material providing low friction and high corrosion resistance.

7. The apparatus of claim 6, wherein the material providing low friction and high corrosion resistance is ceramic.

8. The apparatus of claim 1, wherein the means for partitioning the pressure vessel into a first compartment and a second compartment comprises:

a cylinder block;

a hole in the cylinder block allowing through translation of the means for connecting the first piston and the second piston; and a means for sealing the hole in the cylinder block.

9. The apparatus of claim 8, wherein the means for sealing the hole in the cylinder block comprises a lip seal seated in a circumferential groove in the means for connecting the first piston and the second piston.

10. The apparatus of claim 1, wherein the first compartment of the pressure vessel terminates in a first pipe cap, and wherein the second compartment of the pressure vessel terminates in a second pipe cap.

11. The apparatus of claim 1, wherein the first compartment of the pressure vessel terminates in a first affixed closing plate, and wherein the second compartment of the pressure vessel terminates in a second affixed closing plate.

12. The apparatus of claim 1, wherein a vacuum is stored in the second portion of the first compartment of the pressure vessel.

13. The apparatus of claim 1, wherein the fluid admitted at ambient pressure into the first portion of the first compartment of the pressure vessel is seawater.

14. The apparatus of claim 1, wherein a gas is stored in the second portion of the second compartment of the pressure vessel.

15. The apparatus of claim 1, wherein hydraulic fluid is stored in the first portion of the second compartment of the pressure vessel.

16. A pressure accumulator apparatus for use in offshore drilling and production, comprising:

a pressure vessel having an upper cylindrical compartment and a lower cylindrical compartment;

a cylinder block for partitioning the pressure vessel into the upper cylindrical compartment and the lower cylindrical compartment;

a means for admitting seawater at ambient pressure into a portion of the upper cylindrical compartment of the pressure vessel;

a means for controlling an amount of hydraulic fluid ejected from a portion of the lower cylindrical compartment of the pressure vessel, wherein the ejected hydraulic fluid is delivered to a blowout preventer actuator chamber;

an upper piston member circumscribed by an interior wall of the upper cylindrical compartment of the pressure vessel, said upper piston member being capable of sliding within the upper cylindrical compartment of the pressure vessel;

a lower piston member circumscribed by an interior wall of the lower cylindrical compartment of the pressure vessel, said lower piston member being capable of sliding within the lower cylindrical compartment of the pressure vessel;

a piston rod for connecting the upper piston member and the lower piston member, said piston rod capable of sliding through a bore in the cylinder block; and a volume of precharge gas stored in a second portion of the lower cylindrical compartment.

17. A system for delivering pressurized hydraulic fluid to a blowout preventer for use in offshore drilling and production comprising:

a plurality of dual piston pressure accumulators;

a means for serially connecting hydraulic fluid volumes of the dual piston accumulators; and a structure on which to mount the plurality of dual piston pressure accumulators.

18. The system of claim 17 wherein each dual piston pressure accumulator comprises:

a pressure vessel having a first compartment and a second compartment;

a means for partitioning the pressure vessel into the first compartment and the second compartment;

a means for admitting fluid at ambient pressure into a portion of the first compartment of the pressure vessel;

a means for controlling an amount of hydraulic fluid ejected from a portion of the second compartment of the pressure vessel;

a first piston member circumscribed by an interior wall of the first compartment of the pressure vessel, said first piston member being capable of sliding within the first compartment of the pressure vessel;

a second piston member circumscribed by an interior wall of the second compartment of the pressure vessel, said second piston member being capable of sliding within the second compartment of the pressure vessel; and a means for connecting the first piston member and the second piston member.

19. The system of claim 17 wherein the means for serially connecting the hydraulic fluid volumes of the dual piston accumulators is a hydraulic line connected to the outlet of each dual piston pressure accumulator.

20. The system of claim 17 wherein the structure on which to mount the plurality of dual piston pressure accumulators is the frame of a blowout preventer.

21. The system of claim 17 wherein the plurality of dual piston pressure accumulators is radially arranged on the blowout preventer frame.

22. A method of pressurizing hydraulic fluid in a dual piston pressure accumulator for use in offshore drilling and production comprising the steps of:

drawing a vacuum in the volume of a first portion of a first compartment of a pressure vessel, said first portion being adjacent to a first side of a first piston circumscribed by the first compartment of the pressure vessel;

injecting a gas to pressurize, to a specified pressure, the volume of a first portion of a second compartment of the pressure vessel, said first portion being adjacent to a first side of a second piston circumscribed by the second compartment of the pressure vessel;

filling with hydraulic fluid a second portion of the second compartment of the pressure vessel, said second portion being adjacent to a second side of the second piston;

admitting ambient fluid into a second portion of the first compartment of the pressure vessel, said second portion being adjacent to a second side of the first piston; and wherein the second piston is connected in tension to the first piston.

23. The method of claim 22 wherein the injected gas is nitrogen gas ($N_2$).

24. The method of claim 22 wherein the admitted fluid is seawater.

25. A method of controlling the pressure of hydraulic fluid comprising the steps of:

drawing a vacuum in the volume of a first portion of a first compartment of a pressure vessel, said fist portion being above a first piston circumscribed by the first compartment of the pressure vessel;

injecting a gas to pressurize, to a specified pressure, the volume of a first portion of a second compartment of the pressure vessel, said first portion being beneath a second piston circumscribed by the second compartment of the pressure vessel, wherein the second piston is connected to the first piston by means of a piston rod;

filling with hydraulic fluid a second portion of the second compartment of the pressure vessel, said second portion being above the second piston; and immersing the pressure vessel into a fluid;

admitting ambient fluid into a second portion of the first compartment of the pressure vessel, said second portion being beneath the first piston;

transferring the ambient fluid pressure from the first piston over the piston rod to the second piston;

applying the ambient fluid pressure from the piston rod to the second piston;

imparting the load from the second piston to the hydraulic fluid contained in the volume of the second portion of the second compartment of the pressure vessel; and wherein the piston rod is in tension.

26. The method of claim 25 wherein the gas is nitrogen gas ($N_2$).

27. The method of claim 25 wherein the step of immersing the hydraulic accumulator device comprises submerging the hydraulic accumulator device in a body of seawater.

* * * * *

UNITED STATES PATENT AND TRADEMARK OFFICE

CERTIFICATE OF CORRECTION

PATENT NO. : 6,418,970 B1
DATED : July 16, 2002
INVENTOR(S) : Hans Herman Jacques Deul It is certified that error appears in the above-identified patent and that said Letters Patent is hereby corrected as shown below:

Column 9,
Line 15, please delete "fist" and insert in its place -- first --.

Signed and Sealed this

Twenty-seventh Day of August, 2002

*Attest:*

JAMES E. ROGAN

*Attesting Officer* *Director of the United States Patent and Trademark Office*